(No Model.)
J. H. KRUSE.
WIRING ATTACHMENT FOR BALING PRESSES.
No. 446,600. Patented Feb. 17, 1891.
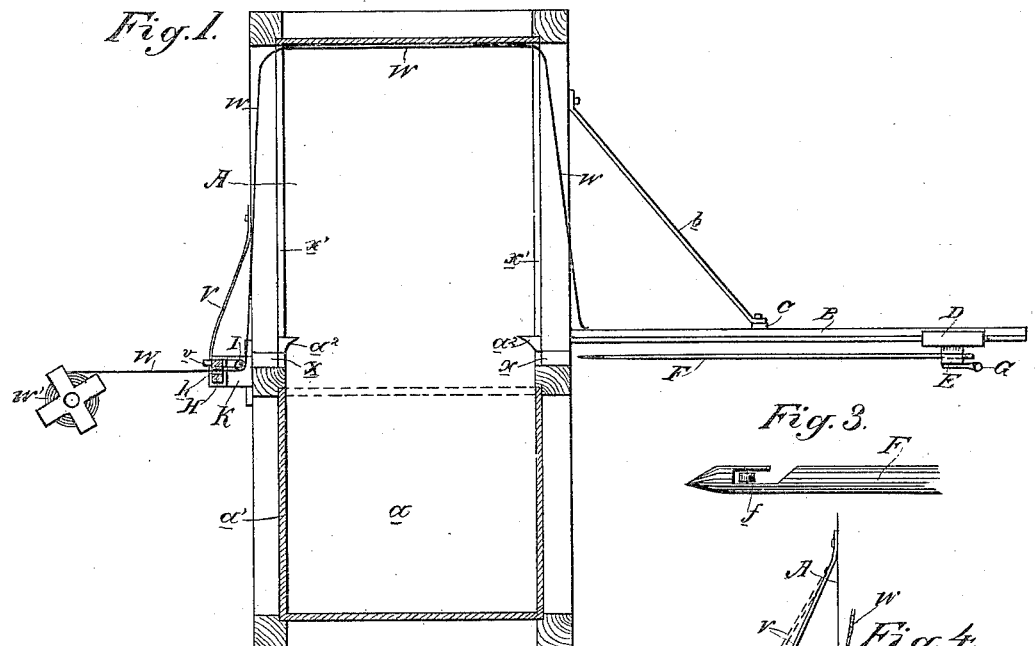
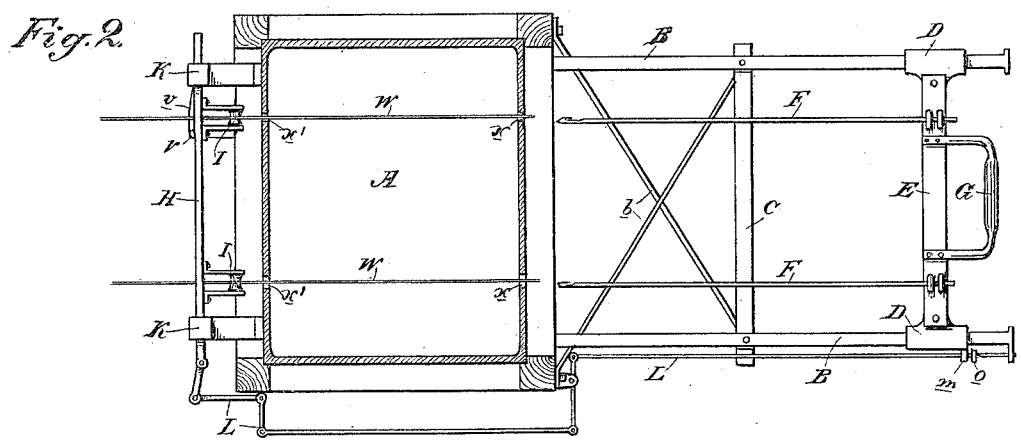
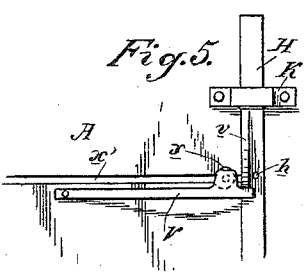
Witnesses,
Geo. H. Strong
J. H. Krouse
Inventor,
John H. Kruse
By Dewey & Co.
Attys

UNITED STATES PATENT OFFICE.

JOHN HENRY KRUSE, OF PORTLAND, OREGON.

WIRING ATTACHMENT FOR BALING-PRESSES.

SPECIFICATION forming part of Letters Patent No. 446,600, dated February 17, 1891.

Application filed April 29, 1890. Serial No. 349,957. (No model.)

*To all whom it may concern:*

Be it known that I, JOHN HENRY KRUSE, a citizen of the United States, residing at Portland, Multnomah county, State of Oregon, have invented an Improvement in Wiring Attachments for Baling-Presses; and I hereby declare the following to be a full, clear, and exact description of the same.

My invention relates to the class of devices for wiring bales of material within the press; and it consists in the novel arrangements, constructions, and combinations hereinafter fully described, and specifically pointed out in the claims.

The object of my invention is to provide a simple and effective device of this class.

Referring to the accompanying drawings for a more complete explanation of my invention, Figure 1 is a horizontal section of a baling-chamber, showing my attachment in plan. Fig. 2 is a vertical cross-section of the chamber, showing my attachment in elevation. Fig. 3 is a detail view of the needle-point. Fig. 4 is a detail horizontal section of bar H, showing its holding-spring. Fig. 5 is an elevation of same.

A is the baling-chamber of the press, having a feed-chamber $a$ and hopper $a'$. Within the chamber are the retaining-hooks $a^2$ for holding the material before the wiring is complete. Extending horizontally outward from the side of the press are the guides B, consisting of bars of suitable cross-section to act as tracks for the reciprocating cross-head which carries the needles. These guides are held rigidly to the side of the frame by suitable braces $b$, and are further held and stiffened by a vertical cross-piece C secured to each. Upon the guides are fitted the sliding end pieces D, which carry the cross-head E, a handle G being attached to said cross-head, whereby it may be moved on the guides to and from the press. Secured to the cross-head E are the needles F, having hooked forward ends, and in said ends are preferably mounted small anti-friction rollers $f$.

Apertures $x$ and slots $x'$ are made in the sides of the baling-press to allow the passage of the needles transversely and the proper seating of the wires. The needles are located so as to travel across the baling-chamber, between it and the feed-chamber, and back of the retaining-hooks—that is to say, at one end of the material to be baled. Though I have here shown but two needles, it is needless to say that I may have a greater number, according to the number of wires used. On the opposite side of the press is mounted in suitable bearings K a vertically-movable bar H, having holes $h$, and secured to its inner side are the anti-friction guide-pulleys I. These are located opposite the apertures $x'$ in the sides of the press, as shown.

The wires W are wound off from suitable reels at W', and thence pass through the holes $h$ in the vertically-movable bar H, and the ends are carried in the first instance transversely through the baling-chamber to project a sufficient distance on the other side. Now it will be seen that when the material is fed into the baling-chamber it presses the wires before it, they paying off from their reels and traveling along in the slots $x'$ of the baling-chamber until they reach a position in which they extend from the reels through the holes in the bar H, thence around the pulleys I, and alongside one side of the press to the far end of the baling-chamber, across it, and back on the other side in slots $x'$, a sufficient projecting end being left in the first instance to provide for this course. Now, the cross-head E being run forward on the guides, the needles pass across the baling-chamber and engage the wires on the other side, just to one side of the pulleys I. Then when the needles are retracted each draws a bight of the wire through the press and far enough beyond to provide, when cut at the bight, a sufficient end to tie to the first end, and there will also be left the other end of the severed bight for the next operation. Now, in order to effect the engagement of the needles with the wires on the other side, I have the following arrangement: L represents, generally, a system of levers by which the vertically-movable bar H is raised. This is done by having a small collar $o$ on the outer end of the lever L, against which a bearing $m'$ on the lower sliding end piece D is adapted to come in contact when the cross-head is drawn back to its farthest limit. This contact operates the system of levers L, and thereby raises the bar H, which movement of the bar carries the wires W up high enough to allow the needles to pass under them. The bar H is held up in this position by means of a spring V, which bears under a lug v on the bar, so that when the bar is raised the lug slips by the spring and the latter springs in under it to hold up the bar. The spring or a portion thereof lies directly in the path of one of the needles F at the limit of its inward stroke. Consequently when the needles are forced through the end of one of them comes in contact with the spring and forces it outwardly, thereby relieving the bar H, which thereupon drops down of its own weight and carries the wires directly into the hooks of the needles.

This wiring attachment is intended to be used principally on horse-power lever reversible presses, where the power used does not permit of the employment of an automatic attachment. In my attachment I obviate the necessity of using blocks, (divider-boards,) thus increasing the capacity of the press. I can use coil-wire, whereby the expense of the costly bale-ties is saved.

Having thus described my invention, what I claim as new, and desire to secure by Letters Patent, is—

1. In a wiring attachment for baling-presses, the combination of a vertically-movable bar for the wires at one side of the press, a reciprocating cross-head at the opposite side, having needles adapted to traverse the baling-chamber, and a support for holding the bar up, said support being in the path of one of the needles and being forced from under the bar by its contact with the needle, substantially as herein described.

2. In a wiring attachment for baling-presses, the combination of a movable support for the wires on one side of the press, a reciprocating cross-head or frame carrying needles on the other side of the press, said needles being adapted to traverse the baling-chamber, levers connected with the movable support and operated by the reciprocating frame to move the support and wires, and a spring-catch for holding said support and relieving it by contact with the needles, whereby the wires are brought back to engage the needles, substantially as herein described.

3. In a wiring attachment for baling-presses, the combination of the vertically-movable bar on one side of the press, having holes for the wire and guide-pulleys, the reciprocating cross-head E, having the needles F, with hooked ends adapted to traverse the baling-chamber, levers L, operated by the reciprocating cross-head for raising the bar H with its wires, and the spring V for holding the bar up and for relieving it by contact with the needles, whereby the wires are dropped down into the hooked ends of the needles, substantially as herein described.

In witness whereof I have hereunto set my hand.

JOHN HENRY KRUSE.

Witnesses:
JAMES R. STODDARD,
LESTER A. SHIPLEY.